United States Patent
Chen (10) Patent No.: US 11,334,143 B2
(45) Date of Patent: May 17, 2022

(54) PROCESSING SYSTEM AND CONTROL METHOD WHEREIN A MICROPROCESSOR CONFIGURED TO SET A PLURALITY OF MEMORIES INTO A SELF-REFRESH MODE AND A MAIN PROCESSOR IN A STANDBY MODE

(71) Applicant: Realtek Semiconductor Corporation, Hsinchu (TW)

(72) Inventor: Ching-Lung Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 57 days.

(21) Appl. No.: 16/874,796

(22) Filed: May 15, 2020

(65) Prior Publication Data

US 2020/0379547 A1 Dec. 3, 2020

(30) Foreign Application Priority Data

May 27, 2019 (TW) .................................. 108118287

(51) Int. Cl.

| G06F 1/3203 | (2019.01) |
|---|---|
| G06F 1/3234 | (2019.01) |
| G06F 12/06 | (2006.01) |
| G06F 1/3287 | (2019.01) |

(52) U.S. Cl.
CPC .......... *G06F 1/3275* (2013.01); *G06F 1/3287* (2013.01); *G06F 12/0646* (2013.01); *G06F 2212/1028* (2013.01)

(58) Field of Classification Search
CPC .................................................. G06F 1/3203

USPC ......................................................... 713/323
See application file for complete search history.

(56) References Cited

U.S. PATENT DOCUMENTS

| 9,846,471 B1* | 12/2017 | Arora ..................... G06F 1/3206 |
|---|---|---|
| 2003/0160980 A1* | 8/2003 | Olsson ....................... G03F 1/76 |
| | | 358/1.9 |
| 2014/0245045 A1* | 8/2014 | Haruki .................. G06F 1/3228 |
| | | 713/323 |
| 2019/0172451 A1* | 6/2019 | Yoo .......................... G10L 25/84 |

FOREIGN PATENT DOCUMENTS

| TW | 201329995 A | 7/2013 |
|---|---|---|
| TW | 201435568 A | 9/2014 |
| TW | 201717026 A | 5/2017 |

* cited by examiner

*Primary Examiner* — Suresh Suryawanshi
(74) *Attorney, Agent, or Firm* — Locke Lord LLP; Tim Tingkang Xia, Esq.

(57) ABSTRACT

A processing system includes random access memory, memories, a main processor, and a microprocessor. The random access memory is configured to store code. The main processor is configured to transfer the code to a first memory in the memories. The microprocessor is configured to set the memories into a self-refresh mode and turn off the main processor in a standby mode. The microprocessor generates a first command based on a predetermined event, in which the main processor is further configured to be activated according to the first command, in order to enable the first memory. The microprocessor executes a standby application according to the code stored in the first memory, in order to confirm whether to operate in the standby mode constantly.

18 Claims, 6 Drawing Sheets

PROCESSING SYSTEM AND CONTROL METHOD WHEREIN A MICROPROCESSOR CONFIGURED TO SET A PLURALITY OF MEMORIES INTO A SELF-REFRESH MODE AND A MAIN PROCESSOR IN A STANDBY MODE

CROSS-REFERENCE TO RELATED APPLICATION

This application claims priority to Taiwan Application Ser. No. 108118287, filed May 27, 2019, which is herein incorporated by reference in its entirety.

BACKGROUND

Field of Invention

The present disclosure relates to a processing system, and in particular, to a processing system and a control method in an electronic device in a standby mode.

Description of Related Art

Electronic devices often use standby mode to save power. In standby mode, specific components and memory are still needed to maintain operation for detecting external instructions to execute wake-up or other preset functions, while the prior art rarely optimizes power-saving for components other than the processor.

SUMMARY

In order to solve the above problems, in an embodiment of the present disclosure, a processing system includes a random access memory, a plurality of memories, a main processor, and a microprocessor. The random access memory is configured to store the code. The main processor is configured to transfer the code to the first memory in the plurality of memories. The microprocessor is configured to set the plurality of memories to enter the self-refresh mode and turn off the main processor in the standby mode, and generate a first instruction based on a predetermined event, wherein the main processor is further configured to be activated based on the first instruction to enable the first memory to execute the standby application based on the code stored in the first memory to confirm whether to continue operating in the standby mode.

Another aspect of the present application provides a control method comprising: storing code by random access memory; transferring the code to a first memory in a plurality of memories by a main processor; setting the plurality of memories into a self-refresh mode and turning off the main processor in the standby mode, and generating a first instruction based on a predetermined event, wherein the main processor is further configured to be activated based on the first instruction to enable the first memory to execute the standby application based on the code stored in the first memory to confirm whether to continue operating in the standby mode.

In summary, the processing system and the control method provided by the embodiment of the present disclosure reduce the memory usage by changing the data address of the memory and the data writing manner, and are matched with the use of the microprocessor and the single core processor to save power in the overall circuit.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

It should be recognized that the terms "first," "second" and "third," etc., are used herein to describe various elements, components, regions, layers and/or blocks. However, these elements, components, regions, layers and/or blocks should not be limited by these terms. These terms are only used to identify a single element, component, region, layer, and/or block. Thus, the first element, component, region, layer and/or block described below may be referred to as the second element, component, region, layer and/or block, without departing from the scope of the present disclosure.

In this document, "one" and "the" can be used to mean one or more, unless the description specifically defines the article. It should be further recognized that the terms "including," "comprising," "having," and similar terms refer to features, regions, integers, steps, operations, elements and/or components described herein, however, one or more of the other features, regions, integers, steps, operations, elements and/or components thereof is not excluded.

Unless otherwise defined, all terms (including technical and scientific terms) used herein have ordinary meaning as can be recognized by those skilled in the art. Specifically, the definition of the above terms in the commonly used dictionary should be interpreted in the content of this specification as a meaning consistent with the relevant field of the present disclosure. Unless specifically defined, these terms are not to be interpreted as ideal or overly formal.

When an element is referred to as "connected" or "coupled" to another element, it can be either directly connected or coupled to the other element, or there can be an additional element between those elements. In contrast, when an element is referred to as being "directly connected" or "directly coupled" to another element, no additional element is present therebetween.

In the following description, a plurality of embodiments of the present disclosure will be disclosed by the drawings, and for the sake of clarity, a number of practical details will be described in the following description. However, it should be understood that these practical details should not be used to limit the present disclosure. That is, in some embodiments of the present disclosure, these practical details are unnecessary. In addition, some of the conventional structures and elements are shown in the drawings in a simplified schematic manner in order to simplify the drawings.

Figure 1:
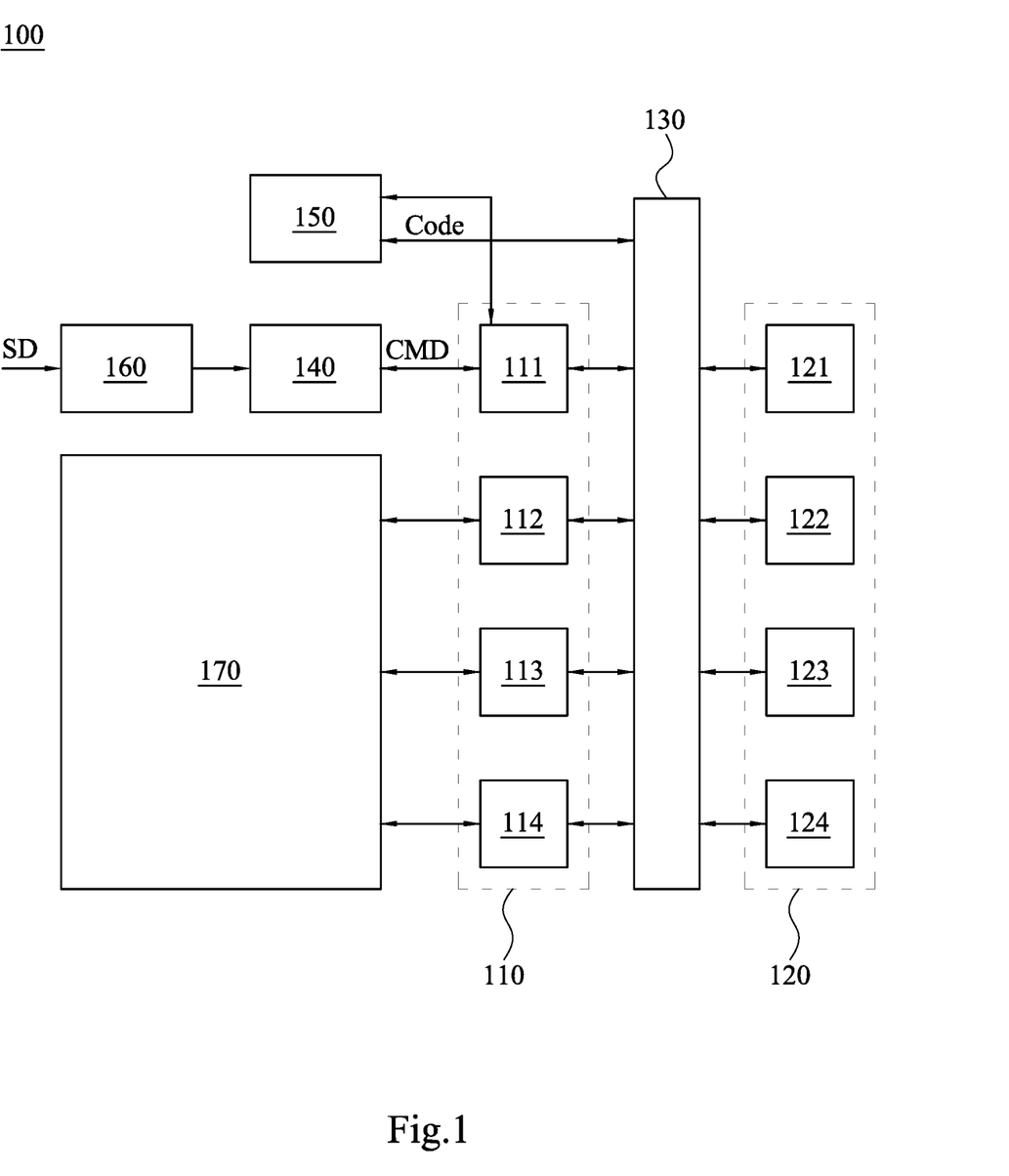
FIG. 1 is a schematic diagram of a processing system according to some embodiments of the present disclosure.

Refer to FIG. 1, which is a schematic diagram of a processing system 100 in accordance with some embodiments of the present disclosure. In some embodiments, the processing system 100 can be an electronic device such as a television or a set-top box, but the present disclosure is not limited thereto. The processing system 100 includes a main processor 110, a memory module 120, a memory controller 130, a microprocessor 140, a random access memory 150, a voice detection circuit 160, and a video processing circuit 170.

In some embodiments, the main processor 110 is a multi-core processor that includes a plurality of processors 111-114. Each of the plurality of processors 111-114 is a processing circuit of the multi-core processor. It is coupled to the memory controller 130 and the video processing circuit 170. In various embodiments, the main processor 110 may be implemented by a central processing unit (CPU), an application-specific integrated circuit (ASIC), a multi-processor, a distributed processing system, or a suitable processing unit, without being limited thereto.

In some embodiments, the video processing circuit 170 is configured to perform audio/video encoding/decoding, scaling, motion compensation, and the like on a video (not shown) provided by an external source. The main processor 110, the memory module 120, and the video processing circuit 170 can operate in cooperation with each other to play the received video.

The memory module 120 includes a plurality of memories 121-124 for being written into the code Code to perform related operations of the processing system 100 in the standby mode. Each of the memories 121-124 includes a plurality of storage spaces (such as the storage space 320 in FIG. 3A), and each storage space 320 corresponds to an address 310, which will be described later with reference to FIG. 3A. In some embodiments, the memory module 120 can also store one or more codes for providing functions such as video playback, web browsing, and teaching applications of the processing system 100. In some embodiments, the memory module 120 can be implemented by a dynamic random access memory (DRAM), but the present disclosure is not limited thereto.

The random access memory 150 is used to store the code Code. In some embodiments, the memory controller 130 is coupled between the main processor 110 and the memory module 120, and writes the code Code in the random access memory 150 to the memory module 102 based on the control of the main processor 110. In some embodiments, the random access memory 150 can also store related data generated by the voice detection circuit 160.

In some embodiments, the code Code includes a plurality of sub-data 340 and is sequentially arranged in a serial form. In some embodiments, the sub-data 340 can be a standby application code in the standby mode, but the present disclosure is not limited thereto.

In some embodiments, the microprocessor 140 can be a single chip microcontroller (e.g., 8051) that is used to generate an instruction based on the output of voice detection circuit 160 while processing system 100 is in standby mode to control the processing system 100.

The voice detection circuit 160 is configured to receive the external data SD and determine whether a predetermined event occurs based on the external data SD. For example, the voice detection circuit 160 can determine by using information like energy, tone, etc. in the external data SD. When it is determined that there is an instruction in the external data SD corresponding to the predetermined event, the voice detection circuit 160 notifies the microprocessor 140 to enable the processor 111 to perform the subsequent operation. In some embodiments, the voice detection circuit 160 may be implemented by a voice recognition chip or alternatively a processing circuit that performs various types of voice recognition algorithms.

In some embodiments, the microprocessor 140 is activated in the standby mode to be used to determine whether to enable the processor 111 based on predetermined events. In other words, the processing system 100 can support the function of voice wake-up. For example, when the voice detection circuit 160 determines that the external data SD is a predetermined event (e.g., a human voice occurs in the environment), the microprocessor 140 may enable the processor 111 to switch the processing system 100 to a low power mode for performing other functions.

The above only describes the setting of the predetermined event by voice wake-up, but the present disclosure is not limited thereto. In other embodiments, the predetermined event may also include a timer that can be used to wake up the processing system 100 after a certain time. The various predetermined events used to wake up the processing system 100 are also within the scope of the present disclosure.

Figure 2:
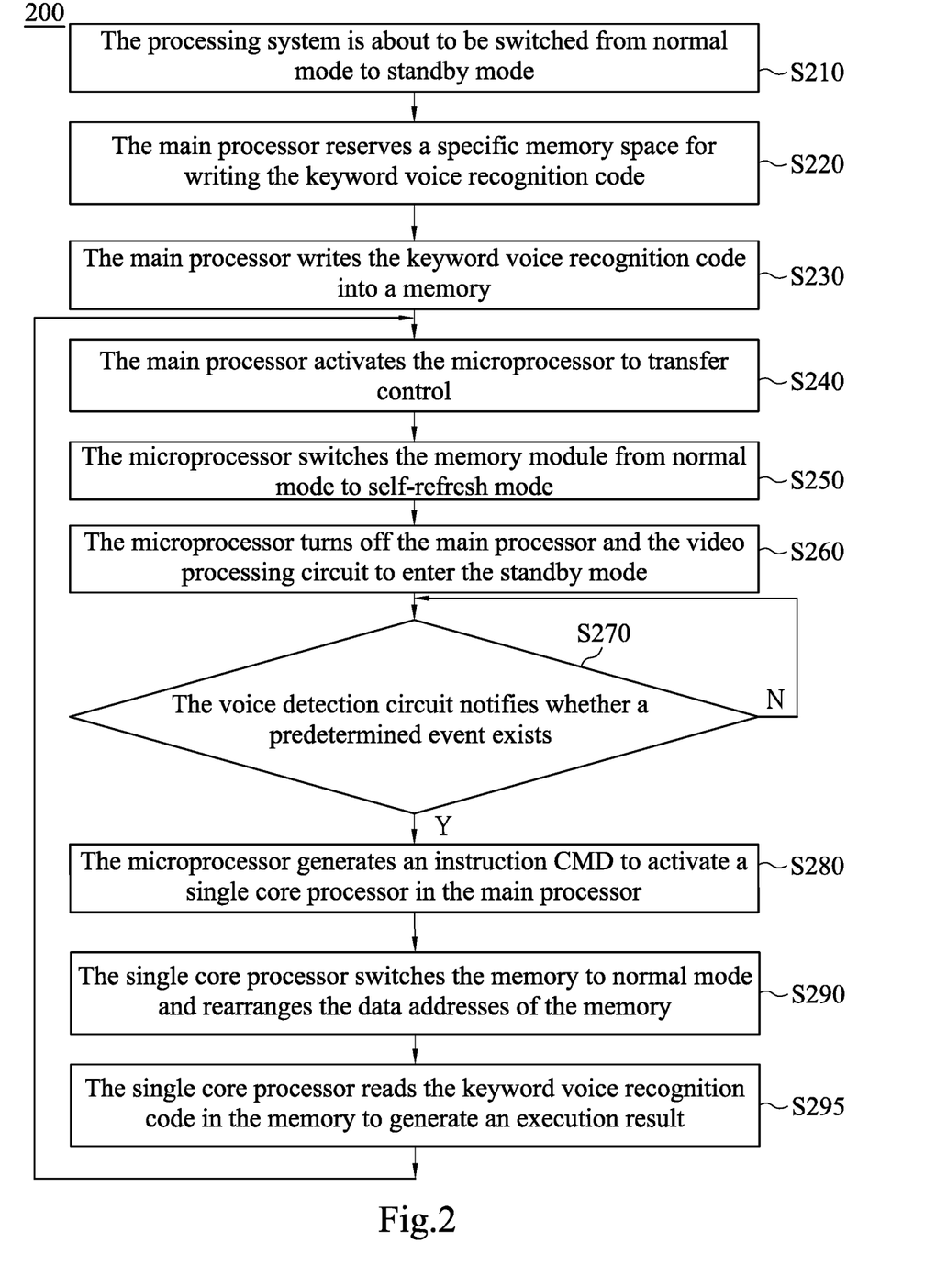
FIG. 2 is a flow chart of a control method according to some embodiments of the present disclosure.

Refer to FIG. 2, which is a flow chart of a control method 200 according to some embodiments of the present disclosure.

For ease of understanding, the control method 200 will be described with reference to FIGS. 3A and 3B. In some embodiments, the control method 200 can be used in conjunction with the microprocessor 140 and processor 111 to save the power consumption of the circuit.

In operation S210, the processing system 100 is about to be switched from the normal mode to the standby mode.

In operation S220, the main processor reserves a specific memory space for writing the code Code. For example, upon receiving an instruction of entering the standby mode, the main processor 110 may first transmit a request to the memory controller 130 to ask for the aforementioned memory space from the memory module 120 (e.g., the multiple storage spaces in FIG. 3B). In some embodiments, the capacity of the memory space is four times the data amount of the code Code, but the present disclosure is not limited thereto.

Figure 3A:
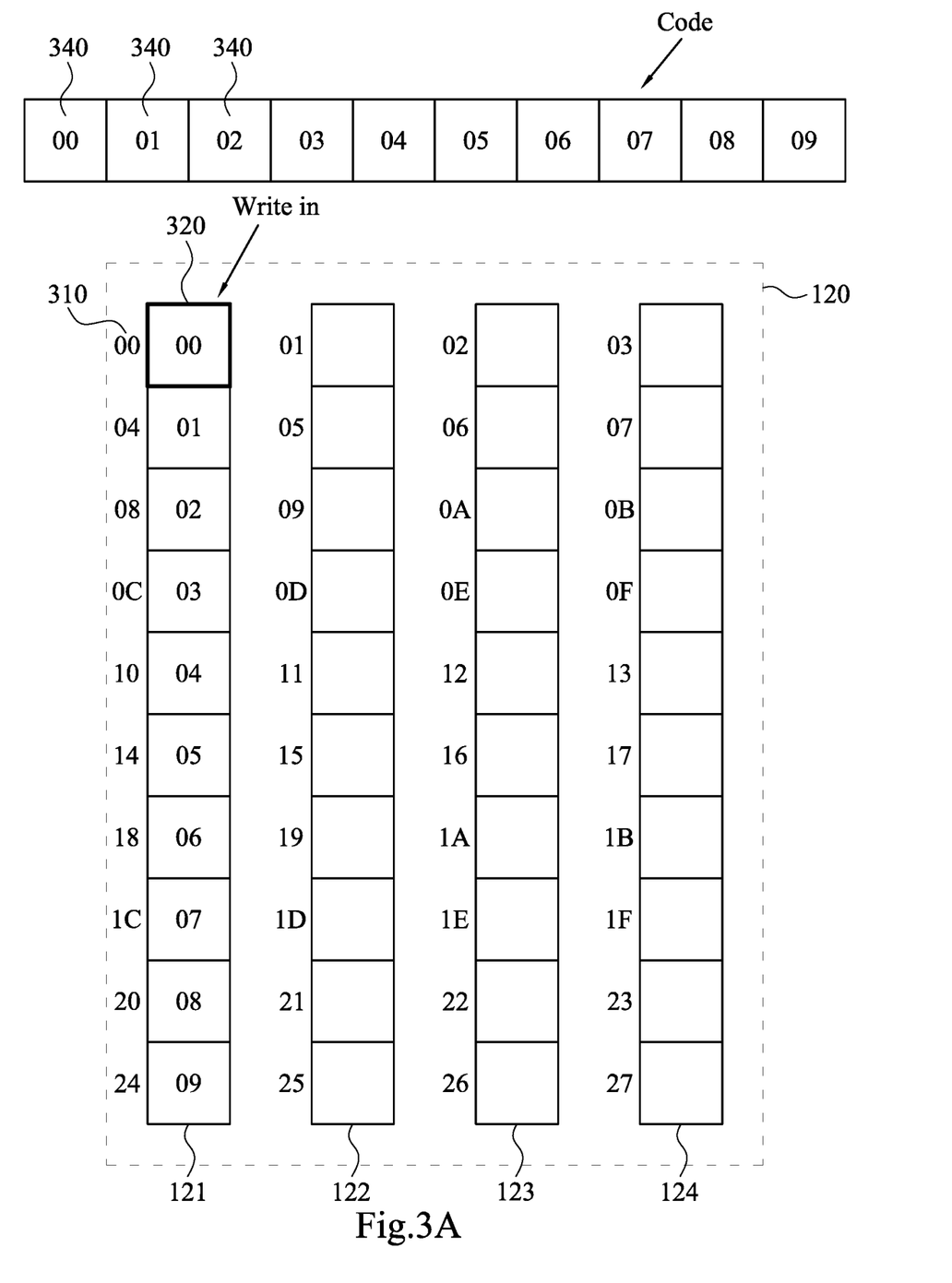
FIG. 3A is a schematic diagram of writing data into a single memory based on an interleaved mode according to some embodiments of the present disclosure.

FIG. 3A is a schematic diagram of writing data into a single memory based on an interleaved mode according to some embodiments of the present disclosure. As shown in FIG. 3A, in operation S220, the memory controller 130 is set to an interleaved mode to alternately set the corresponding addresses 310 (i.e., 00 to 27) to the plurality of memories 121 to 124. For example, the address 00 corresponds to the first storage space 320 of the memory 121, the address 01 corresponds to the first storage space 320 of the memory 122, and the address 02 corresponds to the first storage space 320 of the memory 123, and the address 03 corresponds to the first storage space 320 of the memory 124. Likewise, the memory controller 130 alternately correlates the consecutive addresses 310 to a plurality of memories 121 to 124.

Moreover, in this example, since the code Code has 10 sub-data 340, the memory controller 130 requires 10 storage spaces 310 for each of the memories 121-124. Equivalently, the memory space configured in the memory module 120 is approximately four times the amount of data of the code Code.

Continuing to refer to FIG. 2, in operation S230 (please refer to FIG. 3A together), the main processor writes the code Code in the random memory into a memory. For example, the main processor 110 controls the reading and writing manner of the memory module 120 by the memory controller 130. As shown in FIG. 3A, the memory controller 130 operates in an interleaved mode based on the control of the main processor 110. The memory module 120 sequentially writes the code Code to a plurality of storage spaces 320 of a single memory 121 according to a plurality of addresses 310. With respect to the memory 121, the plurality of addresses 310 are non-contiguous (i.e., 00, 04, 08, . . . ).

In some embodiments, the memory controller 130 uses a predetermined difference value as the number of intervals between the plurality of addresses 310 for storing each data to be written in the single memory 121. In other words, the addresses corresponding to the data written in the memory 121 are sequentially spaced by a predetermined difference (in this example, 4), and the predetermined difference is related to the number of memories included in the memory module 120.

In operation S240, the main processor 110 activates the microprocessor 140 to continue controlling the operation mode of the memory module 120, and turns off the video processing circuit 170.

In some embodiments, the memory module 120 includes a self-refresh mode and a normal mode. The self-refresh mode consumes less power than the normal mode and is used to maintain the function of the memory for saving the data in the storage space 320 in the event that other related systems are powered off.

In operation S250, the microprocessor 140 switches the memory module 120 from the normal mode to the self-refresh mode.

In operation S260, the microprocessor 140 turns off the main processor 110 and the video processing circuit 170 to enter the standby mode.

In operation S270, the voice detecting circuit 160 notifies whether a predetermined event exists (for example, whether a human voice is received).

When it is determined that a predetermined event exists, operation S280 is performed. When it is determined that there is no predetermined event, operation S270 is re-executed.

In operation S280, the voice detection circuit 160 notifies the microprocessor 140 that a predetermined event exists based on the external data SD (e.g., a human voice is received), so the microprocessor 140 generates an instruction CMD to activate a single core processor 111 in the main processor 110. The processing system 100 switches to a low power mode based on the instruction CMD.

In some embodiments, according to an instruction CMD generated by the microprocessor, the processor 111 is activated to successively perform operations S280 through S295 in the low power mode.

Figure 3B:
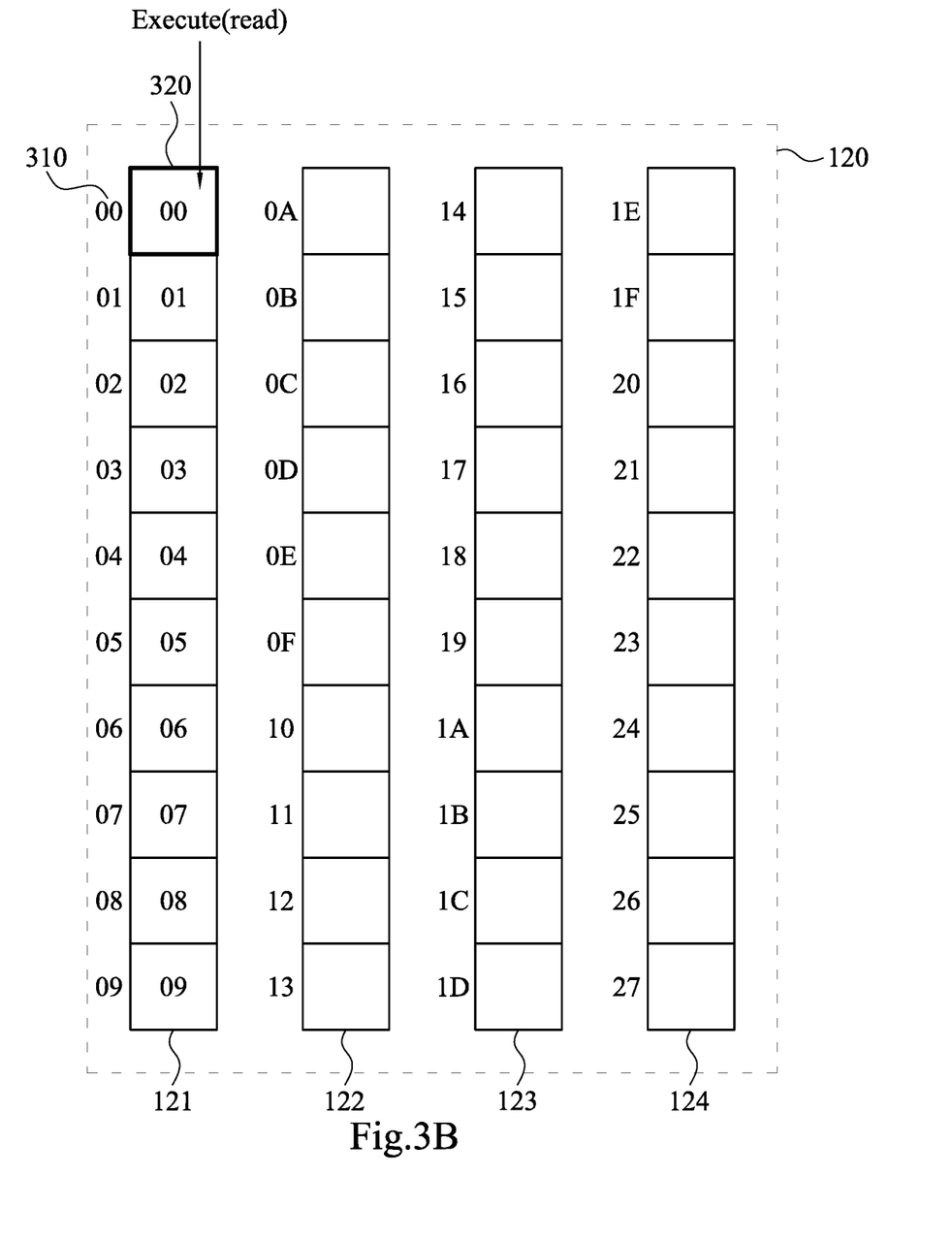
FIG. 3B is a schematic diagram of loading data from a single memory based on a non-interleaved mode according to some embodiments of the present disclosure.

In operation S290, refer to FIG. 3B, which is a schematic diagram of loading data from a single memory based on a non-interleaved mode according to some embodiments of the present disclosure. The processor 111 switches the single memory 121 from the self-refresh mode to the normal mode and rearranges the addresses 310 corresponding to the plurality of storage spaces 320 in sequences according to the order of the memories 121-124.

For example, as shown in FIG. 3B, the addresses 310 corresponding to the plurality of storage spaces 320 of the memory 121 are sequentially rearranged as 00 to 09, and the addresses 310 corresponding to the plurality of storage spaces 320 of the memory 122 are sequentially rearranged as 0A to 13. Likewise, in this state, the addresses 310 corresponding to the memory space 320 in each of the memories 121-124 will be contiguous.

In some embodiments, the processor 111 is activated in accordance with the instruction CMD to enable the memory 121.

In operation S295, the single core processor 111 reads the code Code in the memory 121 according to the instruction CMD, and executes the code Code to generate an execution result.

In some embodiments, the processor 111 sequentially reads the code Code in the memory 121 based on the addresses 310. In some embodiments, the memory controller 130 is configured to operate in a non-interleaved mode based on the control of the processor 111 to read the code Code from the plurality of storage spaces 320 of the memory 121 according to the plurality of addresses 310, to transmit the code Code to the processor 111, and the addresses 310 are contiguous (for example, 00, 01, 02, . . . , 09). In some embodiments, the processor 111 determines whether the processing system 100 continues to maintain the standby mode based on the execution result. When the processor 111 determines that the processing system 100 continues to be in the standby mode according to the execution result, operation S240 is performed.

For example, the code Code is an application that recognizes whether the voice meets a predetermined voice command. When the voice detection circuit 160 determines that a human voice (i.e., a predetermined event exists), the processor 111 is woken up to load the code Code from the memory 121 to execute this application to determine whether the voice meets the predetermined voice command. If yes, the other components of the system are woken up; if not, the processor 111 is turned off and switched to the standby mode again.

With the memory setting manner described above, the processing system 100 of the embodiment of the present disclosure may use the least components (the single processor 111 and the single memory 121) to confirm whether it needs to be woken up in the standby mode. As a result, the overall power consumption of the processing system 100 during operation can be further saved.

Figure 4:
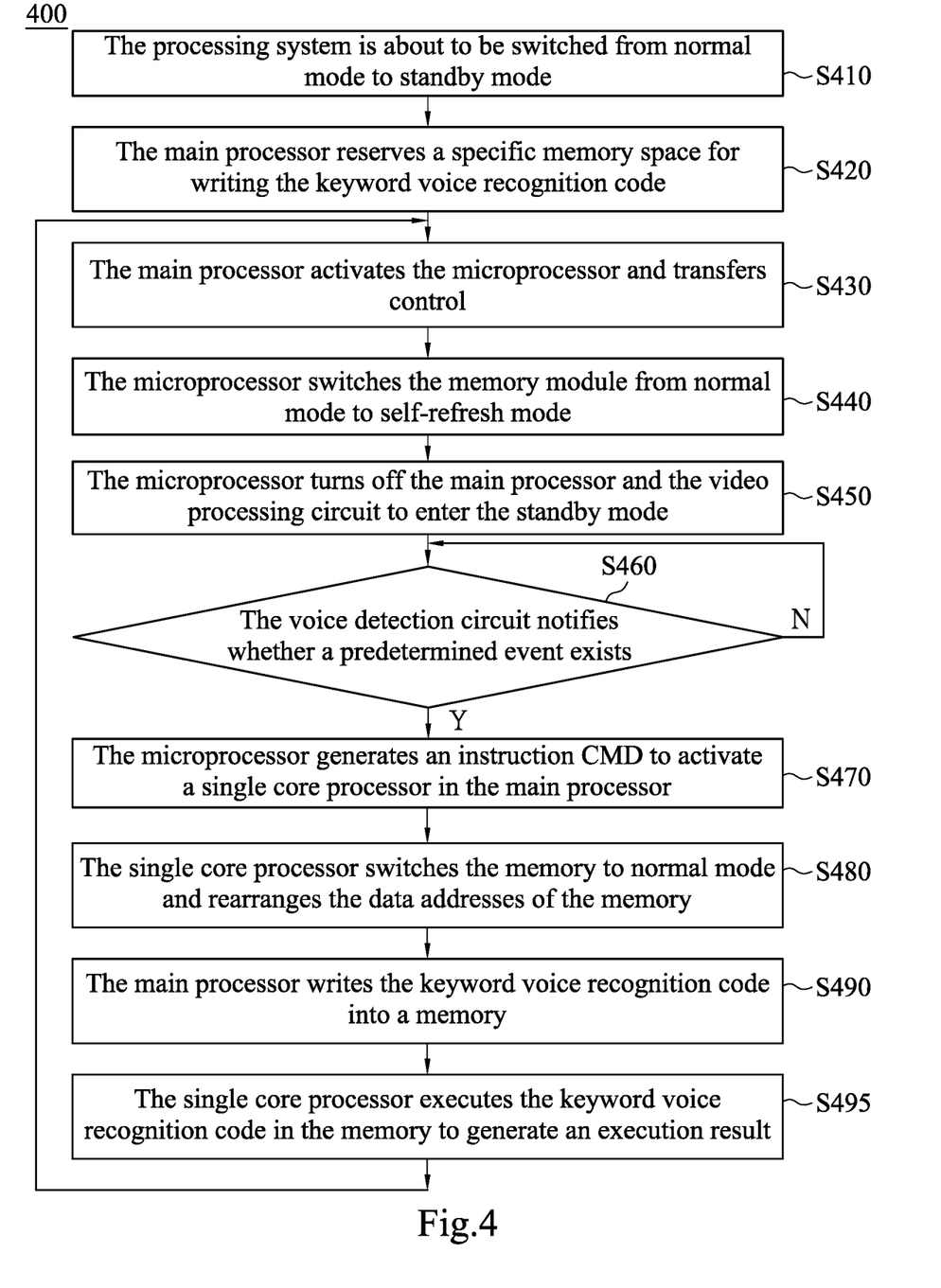
FIG. 4 is a schematic diagram of another control method according to some embodiments of the present disclosure.

Refer to FIG. 4, FIG. 4 is a schematic diagram of another control method according to some embodiments of the present disclosure. For ease of understanding, the control method 400 will be described with reference to FIGS. 1, 3B and 5. In some embodiments, the control method 400 can be used in conjunction with the microprocessor 140 and the single core processor 111 to conserve the power consumption of the circuit.

In contrast to the control method 200, in the control method 400, the main processor 110 transfers data from the random access memory to the memory 121 after being activated by the microprocessor.

In operation S410, the processing system 100 is about to be switched from the normal mode to the standby mode.

In operation S420, the main processor reserves a specific memory space for writing the code Code.

In operation S430, the main processor 110 activates the microprocessor 140 to control the operation mode of the memory module 120.

In operation S440, the microprocessor 140 switches the memory module 120 from the normal mode to the self-refresh mode.

In operation S450, the microprocessor 140 turns off the main processor 110 and the video processing circuit 170 to enter the standby mode.

In operation S460, the voice detection circuit 160 determines whether a predetermined event exists based on the external data SD. When there is a predetermined event, operation S470 is performed. When there is no predetermined event, operation S460 is re-executed.

In operation S470, the voice detection circuit 160 notifies the microprocessor 140 that a predetermined event exists based on the external data SD (e.g., a human voice is received), so the microprocessor 140 generates an instruction CMD to activate the single core processor 111.

For the description of the operations S410 to S460, reference may be made to the related content of the control method 400, and details are not described herein again.

In operation S480, the processor 111 enables the single memory 121, switches the memory 121 from the self-refresh mode to the normal mode, and sets the memory controller 130 to the non-interleaved mode to rearrange the addresses 310.

In operation S490, the processor 111 writes the code Code originally stored in the random access memory 150 into the single memory 121.

Figure 5:
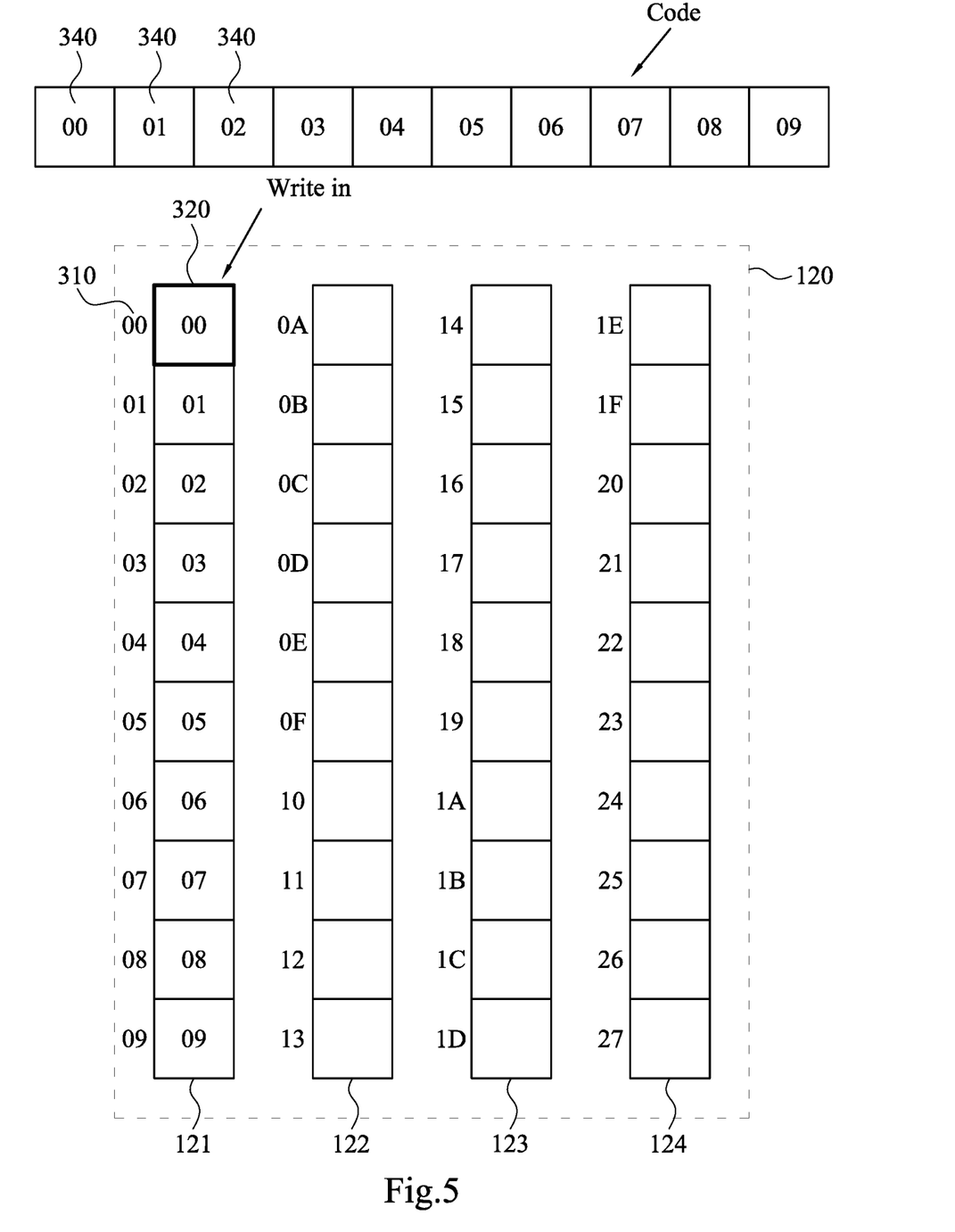
FIG. 5 is a schematic diagram of writing data to a single memory based on a non-interleaved mode according to some embodiments of the present disclosure.

For ease of understanding, operations S480 and S490, please refer to FIG. 5, which is a schematic diagram of writing data to a single memory based on a non-interleaved mode according to some embodiments of the present disclosure. Similar to FIG. 3B, the memory controller 130 rearranges the plurality of addresses 310 of the memory 121 when operating in the non-interleaved mode. In this example, the addresses 310 corresponding to the plurality of storage spaces of the memory 121 are sequentially rearranged as 00 to 09. Therefore, the addresses 310 corresponding to the memory space 320 of the memory 121 will be contiguous. Next, the main processor 110 (and/or the memory controller 130) writes the code Code to the memory 121 based on these addresses 310.

In operation S495, the single core processor 111 reads the code Code in the memory 121 according to the instruction CMD and executes the code Code to generate an execution result.

In some embodiments, the processor 111 determines that the processing system 100 continues to be in the standby mode according to the execution result and performs operation S430.

In some embodiments, the code Code can be a keyword voice recognition code Code for identifying whether the external data SD contains voice or keyword terms.

The plurality of operations of the above control method 200 and control method 400 are merely examples, and are not limited to being performed in the order of this example. Without departing from the operation and scope of the embodiments of the present disclosure, various operations under the control method may be appropriately added, replaced, omitted or performed in a different order.

In summary, the processing system 100 and the control method 200 and control method 400 provided by the embodiment of the present disclosure reduce the usage of the memory module 120 by changing the data address of the memory module 120 and the data writing manner, and are matched with the microprocessor 140 and the single core processor to save power in the overall circuit.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A processing system, comprising:
a random access memory configured to store a code;
a plurality of memories;
a main processor configured to transfer the code to a first memory of the plurality of memories;
a microprocessor configured to set the plurality of memories into a self-refresh mode and turn off the main processor in a standby mode, and generate a first instruction based on a predetermined event,
wherein the main processor is further configured to be activated based on the first instruction to enable the first memory to execute a standby application according to the code stored in the first memory to confirm whether to continue operating in the standby mode.

2. The processing system of claim 1, wherein before the main processor is turned off by the microprocessor, the main processor is configured to transfer the code from the random access memory to the first memory.

3. The processing system of claim 2, further comprising:
a memory controller configured to control reading and writing of the plurality of memories, wherein the memory controller operates in an interleaved mode based on a control of the main processor to sequentially write the code into a plurality of storage spaces in the first memory according to a plurality of addresses, and the plurality of addresses are non-contiguous.

4. The processing system of claim 3, wherein two of the plurality of addresses, which are contiguous, have a predetermined difference therebetween, and the predetermined difference is associated with number of the plurality of memories.

5. The processing system of claim 1, wherein after the main processor is activated by the microprocessor, the main processor is configured to transfer the code from the random access memory to the first memory.

6. The processing system of claim 4, further comprising:
a memory controller configured to control reading and writing of the plurality of memories, wherein the memory controller operates in a non-interleaved mode based on a control of the main processor to sequentially write the code into a plurality of storage spaces in the first memory according to a plurality of addresses, and the plurality of addresses are contiguous.

7. The processing system of claim 1, further comprising:
a memory controller configured to control reading and writing of the plurality of memories, wherein the memory controller is further configured to operate in a non-interleaved mode based on a control of the main processor to read the code from a plurality of storage spaces of the first memory according to a plurality of addresses, to transfer the code to the main processor, and the plurality of addresses are contiguous.

8. The processing system of claim 1, wherein the plurality of memories comprise a plurality of dynamic random access memories.

9. The processing system of claim 1, wherein the main processor comprise a processing circuit of a multi-core processor.

10. The processing system of claim 1, further comprising:
a voice detection circuit configured to determine the predetermined event to enable the microprocessor; and
a video processing circuit configured to process a video data.

11. A control method, comprising:
storing a code by a random access memory;
transferring the code to a first memory of a plurality of memories by a main processor;
setting the plurality of memories into a self-refresh mode, turning off the main processor by a microprocessor in a standby mode, and generating a first instruction based on a predetermined event,
wherein the main processor is further configured to be activated based on the first instruction to enable the first memory to execute a standby application according to the code stored in the first memory to confirm whether to continue operating in the standby mode.

12. The control method of claim 11, wherein the code is transferred from the random access memory to the first memory by the main processor before the main processor is turned off by the microprocessor.

13. The control method of claim 12, further comprising:
controlling reading and writing of the plurality of memories by a memory controller, wherein the memory controller operates in an interleaved mode based on a control of the main processor to sequentially write the code into a plurality of storage spaces in the first memory according to a plurality of addresses, and the plurality of addresses are non-contiguous.

14. The control method of claim 13, wherein two of the plurality of addresses, which are continuous, have a predetermined difference therebetween, and the predetermined difference is associated with number of the plurality of memories.

15. The control method of claim 11, wherein the code is transferred from the random access memory to the first memory by the main processor after the main processor is turned on by the microprocessor.

16. The control method of claim 15, further comprising:
controlling reading and writing of the plurality of memories by a memory controller, wherein the memory controller operates in a non-interleaved mode based on a control of the main processor to sequentially write the code into a plurality of storage spaces of the first memory according to a plurality of addresses, and the plurality of addresses are contiguous.

17. The control method of claim 11, further comprising:
controlling reading and writing of the plurality of memories by a memory controller, wherein the memory controller is further configured to operate in a non-interleaved mode based on a control of the main processor to read the code from a plurality of storage spaces of the first memory according to a plurality of addresses, to transfer the code to the main processor, and the plurality of addresses are contiguous.

18. The control method of claim 11, further comprising:
determining the predetermined event by a voice detection circuit to enable the microprocessor; and
processing a video data by a video processing circuit.

* * * * *